Dec. 17, 1957 C. G. MUNGER 2,816,323
METHOD OF MAKING PLASTIC LINED CONCRETE PIPE AND JOINTS THEREIN
Filed April 22, 1953 2 Sheets-Sheet 1
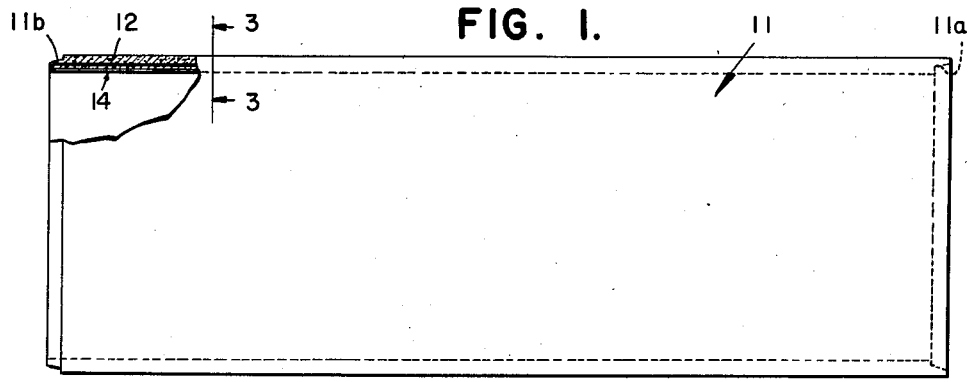
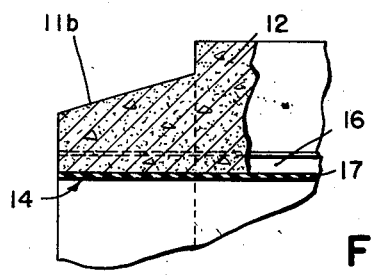
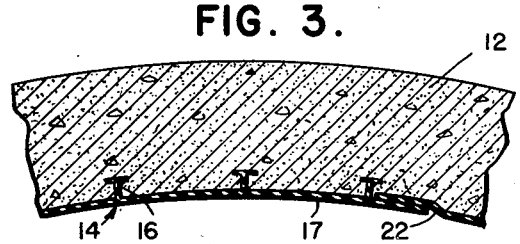
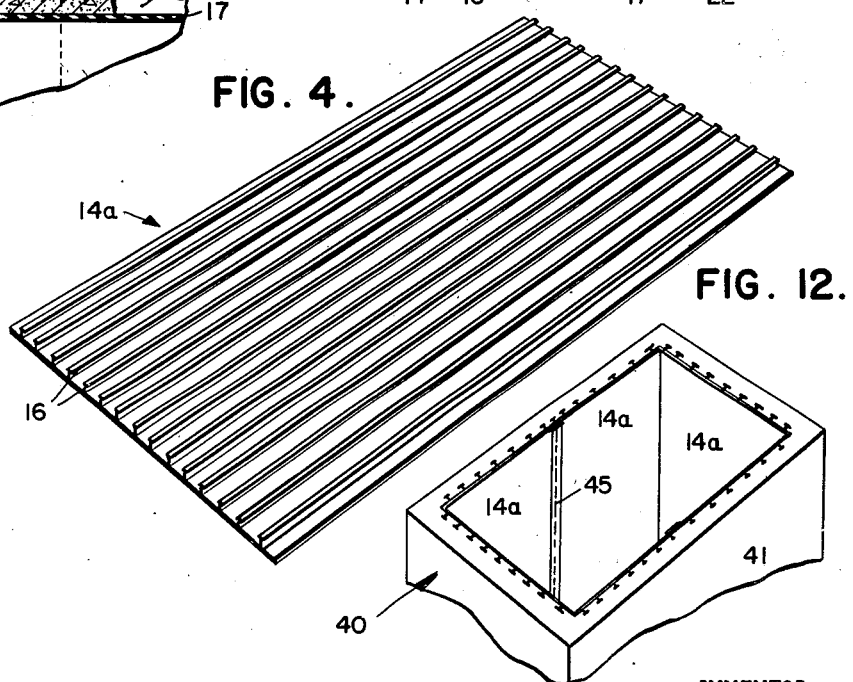
INVENTOR.
CHARLES G. MUNGER
BY
ATTORNEYS

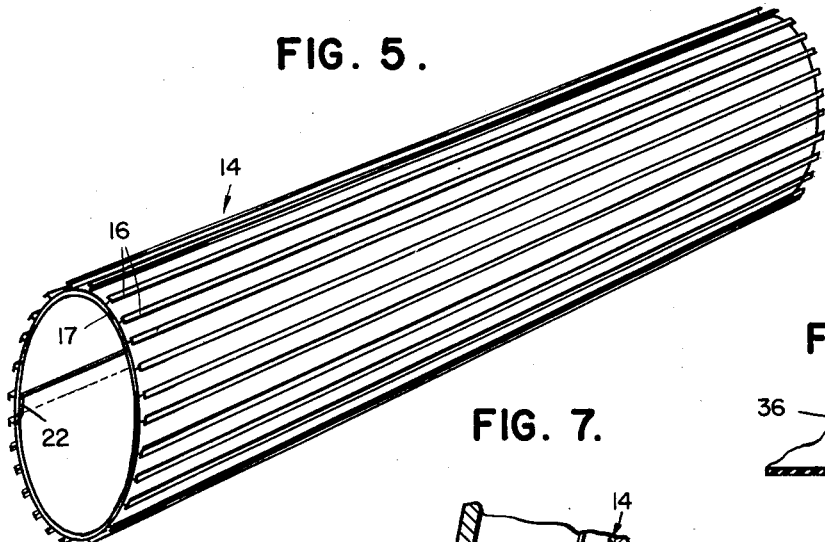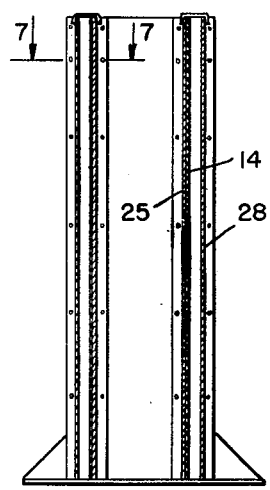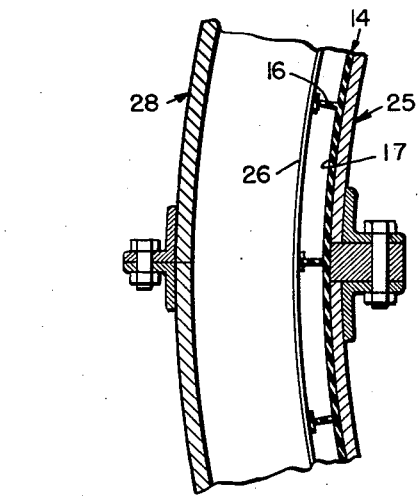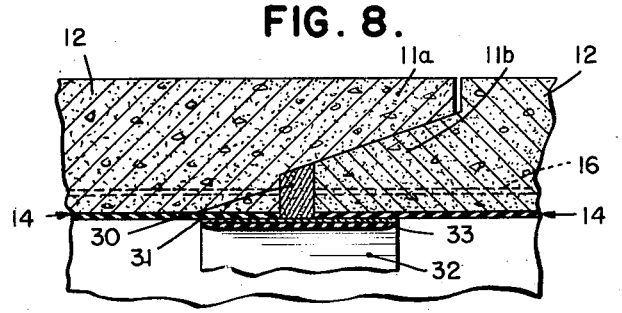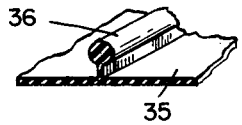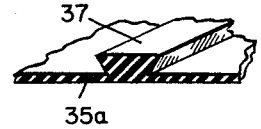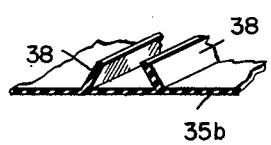

United States Patent Office 2,816,323
Patented Dec. 17, 1957

2,816,323

METHOD OF MAKING PLASTIC LINED CONCRETE PIPE AND JOINTS THEREIN

Charles G. Munger, San Gabriel, Calif.

Application April 22, 1953, Serial No. 350,344

2 Claims. (Cl. 18—59)

This invention has to do generally with the manufacture of concrete pipe, tanks and other concrete structures to provide the same with an interior lining of a material which is substantially chemically inert and resistant to oxidation, acids, alkalis and salts.

Within recent years concrete pipe has been lined with various materials for the purpose of providing a pipe in which the inner surface is relatively impervious to attack by alkalis, acids and other deleterious agents. Such pipe may be used successfully for many years for conveying sewage and various industrial liquids and chemicals. Where plastic lining material has been employed, it has herefore been the practice to first cast the concrete portion of the pipe and subsequently apply the lining material to the inner surface thereof. This is necessarily a laborious, time-consuming and expensive manufacturing process. It is thus disadvantageous for this reason and the further reason that it is difficult to secure a good bond between the concrete and the lining material.

An object of this invention is to provide a novel method of making a new and improved concrete pipe or other structure having an inner lining of another material which is highly resistant to attack by chemical agents and elements which obviates the disadvantages of present pipe and methods of making it.

A more specific object is the provision of a method of making a liner plate made of a so-called plastic material.

A more particular object is to provide a simple method of manufacturing lined concrete pipe which results in a product wherein the lining is an integral part of the pipe firmly locked to the concrete portion of the pipe.

These and other objects will be apparent from the drawings and the following description thereof.

Referring to the drawings:

Fig. 1 is an elevational view, partly in section, showing a concrete pipe made in accordance with the invention;

Fig. 2 is a fragmentary enlarged longitudinal sectional view of the end portion of the pipe shown in Fig. 1;

Fig. 3 is a fragmentary enlarged cross-sectional view on the line 3—3 of Fig. 1;

Fig. 4 is a perspective view of a liner plate made in accordance with the invention;

Fig. 5 is a perspective view of a cylindrical liner plate;

Fig. 6 is a longitudinal sectional view of the cylindrical liner plate in position in a form in which the pipe is cast;

Fig. 7 is an enlarged fragmentary sectional view on the line 7—7 of Fig. 6;

Fig. 8 is an enlarged sectional view taken longitudinally through a joint between two pipe sections;

Fig. 9 is a fragmentary sectional perspective view showing another form of liner plate;

Fig. 10 is a fragmentary sectional perspective view showing still another form of liner plate;

Fig. 11 is a fragmentary sectional perspective view of another form of liner plate; and Fig. 12 is a perspective view, partly in section, showing the application of the liner plate to a concrete tank or the like.

More particularly describing the invention, in Figs. 1, 2 and 3 there is shown a concrete pipe, generally indicated by numeral 11. This pipe comprises an outer cylindrical portion 12 of concrete (Fig. 2) and an inner lining or liner 14.

The liner 14 may be of any suitable material which is resistant to attack by the fluids which the pipe may be used to convey. It preferably should be substantially chemically inert; resistant to oxidation; resistant to acids such as sulphuric, nitric, chromic, oleic, and stearic; resistant to alkalis such as sodium hydroxide, calcium hydroxide and ammonia; and resistant to salts of all types. The material should be impermeable to sewage gases and liquids and be resistant to petroleum oils and gases; to vegetable and animal oils, fats, greases and soaps. It should not be conducive to bacterial or fungus growth.

A suitable material for the liner is a so-called "plastic" by which is meant synthetic and natural resins such as various polymers and elastomers of desired characteristics. However, it is to be understood that either an all-purpose type of lining material or a specific-purpose type may be employed and that the invention is not limited to the use of any particular lining material.

It is a particular feature of the invention that the liner plate is integrally bonded or locked to the concrete portion of the pipe. This is accomplished by the provision of projections on the plate, such as the rails 16, which extend from the cylindrical wall 17 of the liner plate radially into the body of the concrete portion 12. In the form of the invention shown in Figs. 1–3, the rails 16 are T-shaped in cross section and extend longitudinally of the pipe. It will be apparent that their cross-sectional shape serves to firmly lock the liner plate to the concrete portion 12 of the pipe.

In the method of making the pipe, the liner plate is first molded preferably in the shape of a sheet, such as indicated by numeral 14a in Fig. 4. This sheet may be of a length corresponding to the length of the pipe section to be formed and have an area substantially equal to the area of the internal surface of the pipe. The sheet is then rolled into cylindrical form as it is shown in Fig. 5, and the two edges joined in a suitable manner, forming the liner 14. A lapjoint may be formed as shown at 22 (Figs. 3 and 5) and in the case of thermoplastic resins the overlapped ends may be welded together by the application of heat and adhesive or solvent in any manner as known in the art.

The cylindrical liner plate 14 is then secured firmly against the outer surface of an inner pipe form 25 (Figs. 6 and 7) and this may be done by several turns of wire 26. In some cases it may not be necessary to use any means for holding the liner plate in place against the surface of the inner form 25.

Concrete is then poured around the liner plate and between it and an outer form 28 and compacted by any desired method. The space between the outer form and the liner plate into which the concrete is poured, may, of course, contain reinforcement means for the concrete but none has been shown in the drawings since this forms no part of the present invention. After the concrete has set sufficiently, the forms are removed and upon curing a composite lined pipe results which includes an outer annular portion of concrete and an inner plastic lining securely bonded thereto.

Since concrete pipe sections such as that shown in Fig. 1 are ordinarily joined together in the field to form a continuous pipe line of desired length, there is shown in Fig. 8 a type of joint which may be used for producing a continuous uninterrupted lining for the line as a whole. Referring to this figure, reference numerals 11a and 11b indicate the bell and spigot ends of adjoining pipe sections and reference numeral 30 indicates the annular mortar filling or joint therebetween. It may be pointed out in this connection that the lined pipe is usually made in relatively large diameters which makes it possible to perform the joining operations from within the pipe. In making the joint the interior surface of the mortar 30 and adjacent portions of the liner plates of the two pipe sections are given a coating of a suitable adhesive or solvent 31. It is usually desirable to roughen, clean or etch the inner surface of the mortar 30 before applying the adhesive. A plastic joint strip 32 is then placed over the adhesive, the joint strip overlapping the ends of the two lining plates, as shown in the figure. The underside of the joint strip and the liner surfaces it will overlie are preferably first heated to a soft plastic state and the joint strip then applied by pressure. The margins 33 of the strip are then fused or welded to the interior liner plate, and the ends of the strip welded in a lap or other joint.

It is contemplated that the liner plate may be formed with various-shaped projections to provide portions thereof which will serve to securely lock the plate to the concrete body of the pipe. In Fig. 9 there is shown a portion of a liner plate, indicated by 35, which differs from that previously described in that it has a plurality of I-rail projections 36. In Fig. 10 there is shown a liner plate 35a provided with a dovetail-like projection 37. In Fig. 11 a still further form of liner plate, indicated by 35b, is shown, and this is provided with pairs or sets of converging flanges in which there are two inwardly inclined flanges 38 in each set or pair.

It will be obvious that the invention contemplates the provision of any type of projection which will serve to mechanically lock the liner plate in place and that the projections may be in the form of longitudinal or circumferential rails, flanges or the like, or in the form of isolated spaced elements.

While in the above description particular reference has been made to the use of the liner plate in lining concrete pipe, it will be apparent that the plate may be used for lining concrete tanks, walls, floors and other bodies to provide a concrete surface with a chemically inert and resistant lining. Thus, in Fig. 12 there is shown by way of illustration a sectional perspective view of a concrete tank 40 having walls 41 of concrete to which have been applied several liner plate sections 14a. In forming the walls the liner plate sections 14a may be positioned against an inner form and the concrete poured behind the liner plate. Either before or after the concrete is poured the various liner plate sections 14a may be welded into a single continuous unit by the provision of overlapping joint strips 45 of the same material welded thereto. In applying the plate to a floor it may be necessary to first pour the concrete and then apply the liner plate before the concrete has set, vibrating the plate to insure the projections becoming embedded in the concrete.

It will, of course, be obvious that either a single liner plate or a plurality of plates may be used in lining a wall or a pipe. It is contemplated that various other modifications and changes can be made without departing from the scope of the invention as set forth in the following claims.

I claim:

1. The method of forming a plastic lined concrete pipe comprising forming a sheet of deformable, liquid and gas impermeable and corrosion resistant thermoplastic material having a substantially plane relatively smooth surface and an opposed surface provided with locking projections, wrapping said sheet about a form with its smooth surface in contact with said form to produce a tube, thermally bonding adjacent edges of said sheet to produce a fluid tight seal, and molding concrete about said tube in interlocking relationship with said projections.

2. The method of forming a plastic lined reinforced concrete pipe comprising forming a sheet of deformable, liquid and gas impermeable and corrosion resistant plastic material having a substantially plane relatively smooth surface and an opposed surface provided with locking projections, wrapping said sheet about a form with its smooth surface in contact with said form to produce a tube, bonding adjacent edges of said sheet to produce a fluid tight seal, disposing reinforcing material about said tube, and molding concrete about said tube and reinforcing material in interlocking relationship with said projections.

References Cited in the file of this patent

UNITED STATES PATENTS

| 1,095,481 | Van Hook | May 5, 1914 |
| 1,216,317 | Hirsh et al. | Feb. 20, 1917 |
| 1,969,374 | Klefel | Aug. 7, 1934 |
| 2,086,525 | Akers | July 13, 1937 |
| 2,156,604 | Payne et al. | May 2, 1939 |
| 2,172,466 | Edwardes et al. | Sept. 12, 1939 |
| 2,243,427 | Klefel | May 27, 1941 |
| 2,440,754 | Nagel | May 4, 1948 |
| 2,614,312 | Rankin et al. | Oct. 21, 1952 |

FOREIGN PATENTS

| 323,281 | Great Britain | Jan. 2, 1930 |